(12) United States Patent
Vogel et al.

(10) Patent No.: US 8,332,110 B2
(45) Date of Patent: Dec. 11, 2012

(54) METHOD FOR DETERMINING THE AXIAL WEAR AND THE COUNTERFORCE GRADIENT IN A MULTIPLE DISK SWITCHING ELEMENT

(75) Inventors: Volker Vogel, Friedrichshafen (DE); Rainer Denzler, Baienfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 306 days.

(21) Appl. No.: 12/744,488

(22) PCT Filed: Dec. 2, 2008

(86) PCT No.: PCT/EP2008/066578
§ 371 (c)(1),
(2), (4) Date: May 25, 2010

(87) PCT Pub. No.: WO2009/074481
PCT Pub. Date: Jun. 18, 2009

(65) Prior Publication Data
US 2010/0241327 A1    Sep. 23, 2010

(30) Foreign Application Priority Data
Dec. 10, 2007 (DE) .......................... 10 2007 055 743

(51) Int. Cl.
*G06F 7/00* (2006.01)

(52) U.S. Cl. ........................................................ 701/67
(58) Field of Classification Search .................. 701/67
See application file for complete search history.

(56) References Cited

U.S. PATENT DOCUMENTS

| 6,771,031 B1 * | 8/2004 | Bai .................................. 318/9 |
| 6,896,112 B2 | 5/2005 | Berger et al. |
| 2005/0148429 A1 | 7/2005 | Imai et al. |
| 2007/0267268 A1 | 11/2007 | Baehr et al. |

FOREIGN PATENT DOCUMENTS

| DE | 197 00 936 A1 | 7/1997 |
| DE | 199 15 207 A1 | 10/2000 |
| DE | 102 25 262 A1 | 2/2003 |
| DE | 102 36 540 A1 | 2/2003 |
| EP | 1 384 912 A1 | 1/2004 |
| EP | 1384912 | * 1/2004 |
| WO | 03/016743 A1 | 2/2003 |

* cited by examiner

*Primary Examiner* — Thomas Tarcza
*Assistant Examiner* — Maceeh Anwari
(74) *Attorney, Agent, or Firm* — Davis & Bujold, PLLC

(57) ABSTRACT

A method of detecting axial wear and a counterforce gradient of a multiple disc switching element (1) with position-controlled actuation with an electric motor (2), a spur gear stage (3) and a ball ramp (4) by one of a hydraulic pressure actuator and an electromagnetic actuator. The method comprises the step of determining, when a vehicle is at a standstill, the axial wear (J) and the counterforce gradient or the rigidity of the system by an overrun adaptation.

4 Claims, 2 Drawing Sheets

METHOD FOR DETERMINING THE AXIAL WEAR AND THE COUNTERFORCE GRADIENT IN A MULTIPLE DISK SWITCHING ELEMENT

This application is a National Stage completion of PCT/EP2008/066578 filed Dec. 2, 2008, which claims priority from German patent application serial no. 10 2007 055 743.6 filed Dec. 10, 2007.

FIELD OF THE INVENTION

The present invention relates to a method for determining the axial wear and the counterforce gradient in a multiple disc switching element with position-controlled actuation.

BACKGROUND OF THE INVENTION

In the prior art, multiple disc switching elements of a drive train are actuated in such a way that the torque that is to be transmitted by the switching element is adjusted by means the engine torque of an electric motor via the clutch pressure of a pressure actuator, or via the attractive force of an electromagnet. The disadvantage of the known torque, pressure, or force-based actuation methods is the occurrence of strong hysteresis effects which have an adverse effect on the accuracy of the torque to be transmitted.

The applicant's German patent application with the file number 10 2006 056 515.0, which has not yet been published, discloses a method of actuating a clutch in which the torque to be transmitted by the clutch is continuously adjusted by electromechanical, hydraulic, or electromagnetic means, the torque that is to be transmitted being adjusted using a position-dependent clutch torque set-point value. In this way, hysteresis effects can largely be avoided.

With the known method, there is a proportional dependence for the electromechanical adjustment of the torque between the rotational angle of the electric engine and the clutch position, i.e. the position of a movable clutch part, so that the clutch position is controlled by means of the electric motor position control. Here, the rotary motion of the electric motor is transmitted via a spur-gear stage and a ball ramp to the movable clutch part.

Systems of this type with position-controlled actuation of a multiple-disc clutch or a multiple-disc brake are subject to changes caused by the axial wear on the discs, which also results in changes in the counterforce gradient or, as the case may be, the rigidity of the system. In addition, in case of electromechanical actuation using a spur-gear stage and a ball ramp, there are disturbing effects due to different temperature characteristics, hysteresis effects, or the notchiness of the system caused by the engagement of the gear teeth with the spur-toothed spur gear stage between electric motor and the ball ramp.

SUMMARY OF THE INVENTION

The object underlying the present invention is to disclose a method for determining the axial wear and counterforce gradient or, as the case may be, the rigidity of the system in a multiple disc switching element with position-controlled actuation which produces as accurate results as possible. In case of electromagnetic actuation using a spur-gear stage and a ball ramp, the results should be largely independent of the disturbing effects of notchiness and hysteresis.

Thus a method of detecting the axial wear and the counterforce gradient or, the rigidity of the system having a multiple disc switching element with position-controlled actuation is proposed, in the context of which the axial wear and the counterforce gradient and/or the rigidity of the system are determined by means of an overrun adaptation when the vehicle is at a standstill.

According to the invention, when the vehicle is at a standstill, the complete operating range of the discs is scanned by an ascending and descending ramp. Using the position control, stalling situations, i.e. situations in which the position does not change by varying the torque, can be reduced to an absolute minimum, which advantageously limits the influence of notchiness when a spur-gear stage is provided.

Furthermore, according to the invention, in case of electromechanical actuation via a spur-gear stage and a ball ramp, the hysteresis of the scanned ramp can be kept to a minimum by varying the motor torque of the electric motor, such that with the high quality of the ascending and descending ball ramp achievable in this way, not only the axial wear in the discs can be measured, but also the counterforce gradient of the system.

According to an advantageous embodiment of the invention, both the axial wear of the disc pack and the counterforce gradient of the system can be achieved by averaging the correspondingly measured values for the ascending and descending ramp.

BRIEF DESCRIPTION OF THE DRAWINGS

The invention will be explained in more detail below on the basis a multiple-disc clutch with position-controlled electromechanical actuation by means of an electric motor with reference to the attached drawings. The drawings show.

DETAILED DESCRIPTION OF THE PREFERRED EMBODIMENTS

Figure 1:
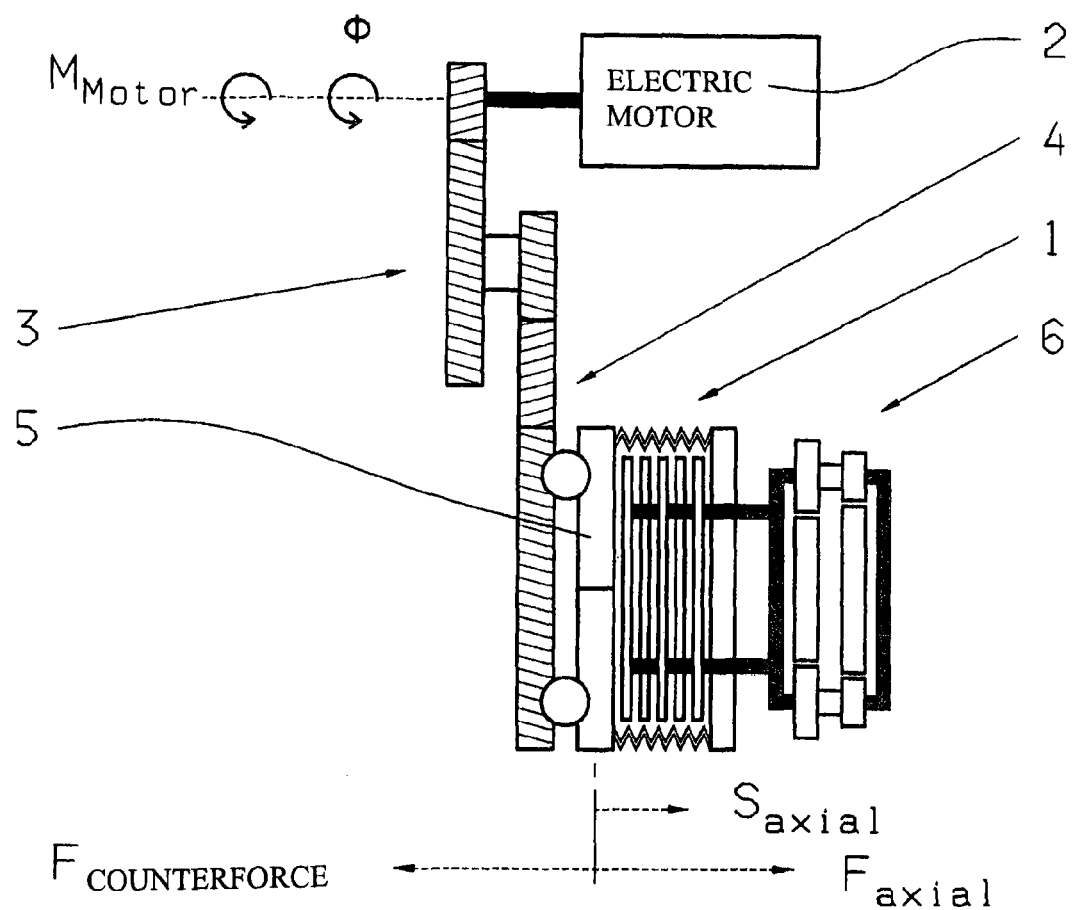
FIG. 1: A schematic representation of a system comprising a multiple disc clutch with position-controlled actuation, in which the clutch is controlled by means of an electric-motor position control using a spur gear stage and a ball ramp.

FIG. 1 shows a multiple disc clutch 1 that can be actuated in a position-controlled manner; the position being controlled by a an electric motor 2 whose rotational movement is transmitted via a spur-gear stage 3 and a ball ramp 4 to an axially movable clutch part 5. The figure also shows a planetary gear set 6 that is connected to the output side of the clutch 1.

The force acting on the disc set of the clutch 1 is designated as $F_{axial}$ and the counterforce produced by the system, which corresponds to the rigidity of the system, is designated as $F_{counterforce}$. Additionally, the axial displacement of the axially movable clutch part 5 due to the rotational movement of the electric motor 2 about an angle of rotation $\phi$ with a torque $M_{motor}$ is designated as $S_{axial}$.

Figure 2:
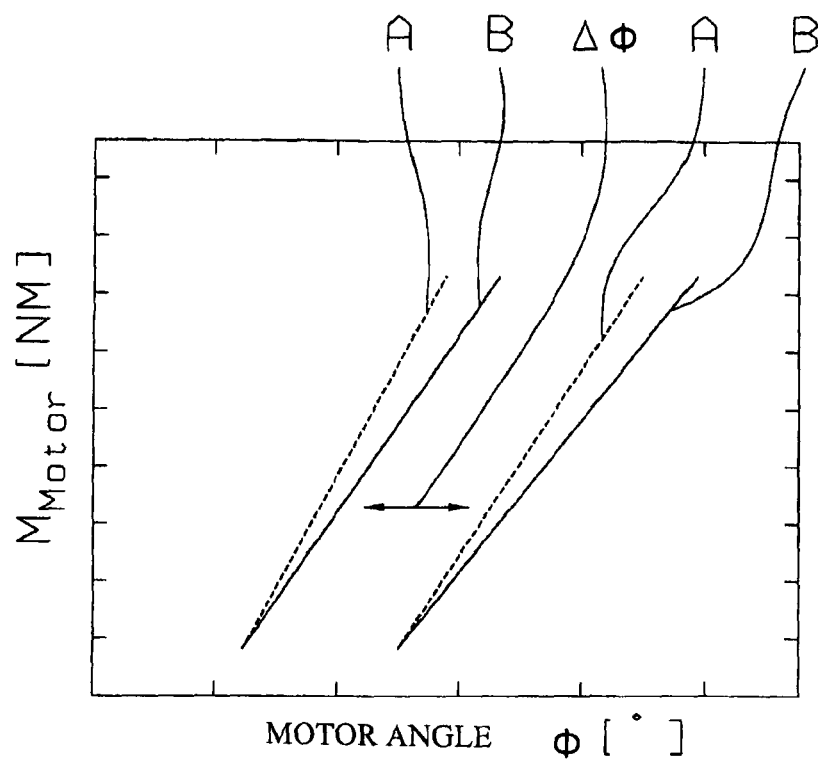
FIG. 2: A motor-torque/motor-angle diagram to illustrate the axial wear and the change in the counterforce gradient or, as the case may be, the rigidity of the system.

FIG. 2 illustrates the change in the control system of the clutch due to the axial wear and the change in the counterforce gradient or, as the case may be, the rigidity of the system by means of a torque-motor angle diagram. Here, $\Delta\phi$ designates the difference with regard to the angle of rotation $\phi$ of the electric motor that is required in order to produce axial displacement of the axially movable clutch part or, as the case may be, the angle differential caused by the axial wear with an identical clutch torque.

In FIG. 2, curve A represents the counterforce characteristic curve with a predetermined axial wear, curve B being a counterforce characteristic curve of the same system with different axial wear. This demonstrates that knowing the current counterforce characteristic curve is particularly important for the position-controlled actuation of the clutch because the torque supplied by the electric motor is supposed to be adjusted to the counterforce characteristic curve and/or counterforce gradient.

Figure 3:
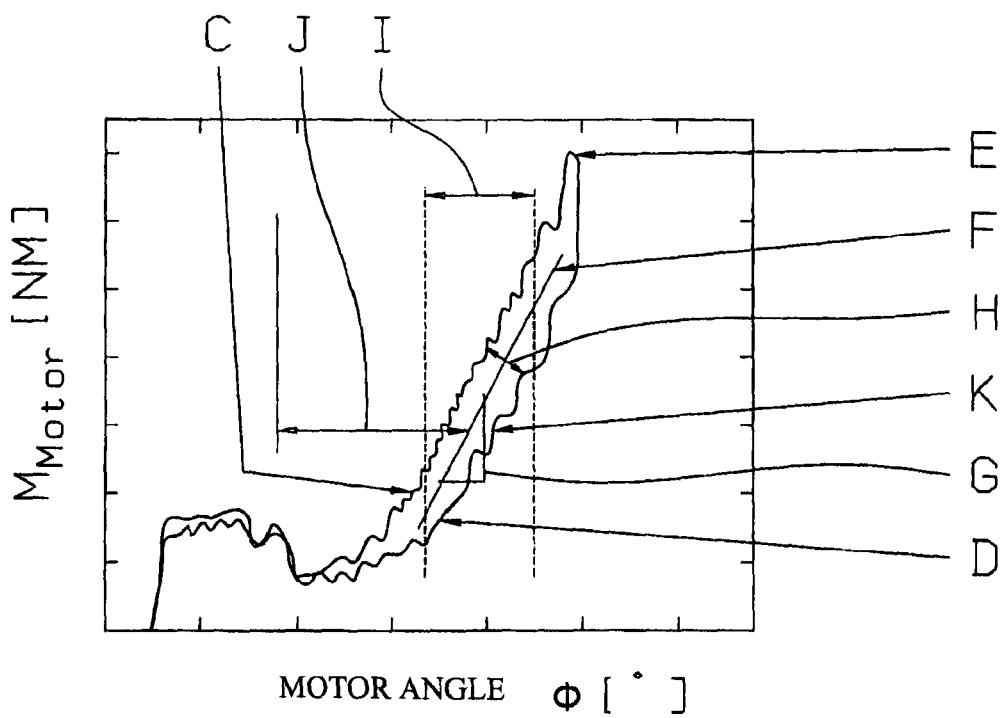
FIG. 3: A motor-torque/motor-angle diagram to illustrate the method according to the present invention.

According to the invention, and with reference to FIG. 3, it is proposed that for measuring the axial wear and the counterforce gradient or, the rigidity of the system for a disc-shifting element with position-controlled actuation, the axial wear and the counterforce gradient or the rigidity of the system is detected by means of an overrun adaptation when the vehicle is at a standstill.

According to the present invention, when the vehicle is at a standstill, the entire operating range I of the clutch discs is scanned by an ascending and descending position-controlled ramp. In doing so, depending on the motor angle, the torque is increased in such a way that the axially movable clutch part 5 can be displaced. With this conception, stalling situations, which considerably limit the impact of the notchiness on the spur-gear stage, are largely avoided. In FIG. 3, a stalling situation is designated as K.

In FIG. 3, the incoming ramp is designated as C and the outgoing ramp as D, and the transition between the ramps as E. Furthermore, in FIG. 3 the counterforce characteristic curve is designated as F, and its gradient is illustrated by the slope triangle G.

According to the invention, the hysteresis H of the scanned ramp is kept to a minimum by means of a system-inherent variation of the motor torque of the electric motor (i.e. the position-controller), so that with the high quality of the ascending and descending ramp C, D obtained in this way, in addition to the axial wear in the discs, the counterforce gradient or the rigidity of the system, can also be measured. In FIG. 3, the axial wear in the clutch is designated as J. The variation of the motor torque corresponds to the "trepidation" of the ramps C, D.

According to an advantageous embodiment of the invention, the axial wear J of the discs and the counterforce characteristic curve F or, as the case may be, the counterforce gradient of the system (i.e. the counterforce characteristic curve) is determined by averaging the values measured for the ascending and descending ramp C, D. In the shown example, the axial wear is defined as the interval between a null position and the middle of the operating range of the discs.

REFERENCE NUMERALS

1 Disc clutch
2 Electric motor
3 Spur-gear stage
4 Ball ramp
5 Axially movable clutch part
6 Planetary gear set
$F_{axial}$ Force acting on the disc set of the clutch 1
$F_{counterforce}$ Counterforce
$S_{axial}$ axial displacement of the axially movable clutch part 5
$M_{motor}$ Torque of the electric motor
$\varphi$ Angle of rotation of the electric motor
A Counterforce characteristic curve
B Counterforce characteristic curve
C Ingoing ramp
D Outgoing ramp
E Transition between the ramps C and D
F Counterforce characteristic curve
G Slope triangle
H Hysteresis
I Operating range of the discs of clutch 1
J Axial wear in clutch 1
K Stalling situations

The invention claimed is:

1. A method of detecting both axial wear and one of a counterforce gradient and a rigidity of a system of a multiple disc switching element (1) with position-controlled actuation with an electric motor (2), a spur gear stage (3) and a ball ramp (4), by one of a hydraulic pressure actuator and an electromagnetic actuator, the method comprising the step of:
   determining, when a vehicle is at a standstill, the axial wear (J) and the counterforce gradient or the axial wear (J) and the rigidity of the system by an overrun adaptation;
   scanning an entire operating range (I) of discs of the switching element (1) with an ascending and a descending position-controlled ramp (C, D) when the vehicle is at a standstill;
   detecting the axial wear (J) of the discs and the counterforce gradient of the system by averaging corresponding measured values for the ascending and the descending ramp and
   maintaining a hysteresis (H) of the scanned ramp (C, D) to a minimum by varying motor torque ($M_{motor}$).

2. The method of detecting both the axial wear and one of the counterforce gradient and the rigidity of the system of a multiple-disc switching element according to claim 1, further comprising the step of avoiding stalling situations by displacing an axially movable clutch part (5) by increasing torque, depending on a motor angle.

3. The method of detecting both the axial wear and one of the counterforce gradient and the rigidity of the system of a multiple-disc switching element according to claim 1, further comprising the steps of:
   adjusting and making current a counterforce characteristic curve or a counterforce gradient, and
   position control actuating the clutch based on at least one of the current counterforce characteristic curve or the counterforce gradient.

4. A method of detecting axial wear and a counterforce gradient in a multiple disc switching element (1) which is actuated by an electric motor (2), a spur gear stage (3) and a ball ramp (4), the method comprising the steps of:
   measuring values of torque and angle of rotation of the electric motor (2) over an entire operating range (I) of discs of the switching element (1), when the vehicle is at a standstill, to determine an ascending and a descending position-controlled gradient (C, D) with a transition (E) occurring between the ascending position-controlled gradient (C) and the descending position-controlled gradient (D);
   varying the motor torque ($M_{motor}$) to minimize a hysteresis (H) of the ascending and the descending position-controlled gradient (C, D); and
   detecting the axial wear (J) of the discs of the switching element (1) and the counterforce gradient of the system by averaging corresponding measured values for the ascending and the descending position-controlled gradient (C, D).

* * * * *